US006959828B2

(12) United States Patent
Eijkelenberg et al.

(10) Patent No.: US 6,959,828 B2
(45) Date of Patent: Nov. 1, 2005

(54) NON-FRAGMENTING PRESSURE RELIEF APPARATUS

(75) Inventors: Tom Eijkelenberg, Westerlo (BE); Guido Dom, Olen (BE)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 10/712,180

(22) Filed: Nov. 13, 2003

(65) Prior Publication Data

US 2005/0103786 A1 May 19, 2005

(51) Int. Cl.⁷ ............................................... B65D 90/36
(52) U.S. Cl. ............................... 220/89.2; 137/68.25
(58) Field of Search ........................... 220/89.2, 203.18; 137/68.19–68.28

(56) References Cited

U.S. PATENT DOCUMENTS

| | | | |
|---|---|---|---|
| 3,526,336 A | 9/1970 | Wood | |
| 4,067,154 A | 1/1978 | Fike, Jr. | |
| 4,404,982 A | 9/1983 | Ou | |
| 4,512,171 A | 4/1985 | Mozley | |
| 4,512,491 A | * 4/1985 | DeGood et al. | ........... 220/89.2 |
| 4,662,126 A | 5/1987 | Malcolm | |
| 4,669,626 A | 6/1987 | Mozley | |
| 4,759,460 A | 7/1988 | Mozley | |
| 4,777,974 A | 10/1988 | Swift et al. | |
| 4,821,909 A | 4/1989 | Hibler et al. | |
| 5,036,632 A | 8/1991 | Short, III et al. | |
| 5,154,202 A | * 10/1992 | Hibler et al. | ............. 137/68.27 |
| 5,267,666 A | 12/1993 | Hinrichs et al. | |
| 5,305,775 A | 4/1994 | Farwell | |
| 5,467,886 A | 11/1995 | Hinrichs | |
| 5,996,605 A | * 12/1999 | Farwell | .................... 137/68.21 |
| 6,070,365 A | 6/2000 | Leonard | |
| 6,494,074 B2 | 12/2002 | Cullinane et al. | |
| 6,540,029 B2 | 4/2003 | Snoeys et al. | |
| 6,792,964 B2 | * 9/2004 | Farwell et al. | ........... 137/68.25 |

FOREIGN PATENT DOCUMENTS

FR 957849 12/1947

* cited by examiner

*Primary Examiner*—Lien M. Ngo
(74) *Attorney, Agent, or Firm*—Hovey Williams LLP

(57) ABSTRACT

A non-fragmenting pressure relief apparatus includes a rupture disc having a central bulged or flat section and a peripheral flange portion. Certain embodiments of the invention have a butterfly shaped element having two wing panels attached to the underside of a rupture disc of the apparatus. A line of weakness of major length extends around the periphery of the central section of a disc and C-shaped end region lines of weakness in the wing panels, which define a hinge portion of the disc therebetween, first converge and then diverge from one another, and connect with the major line of weakness. Application of an overpressure to the rupture disc apparatus causes the entire line of weakness to sever including the end region lines of weakness whereby divergence of the opening force at the hinge portion of the disc prevents separation of the central section of the disc from the peripheral portion of the disc. In another embodiment, the butterfly shaped element is omitted and the C-shaped end region lines of weakness are provided in the central section of the disc.

13 Claims, 9 Drawing Sheets

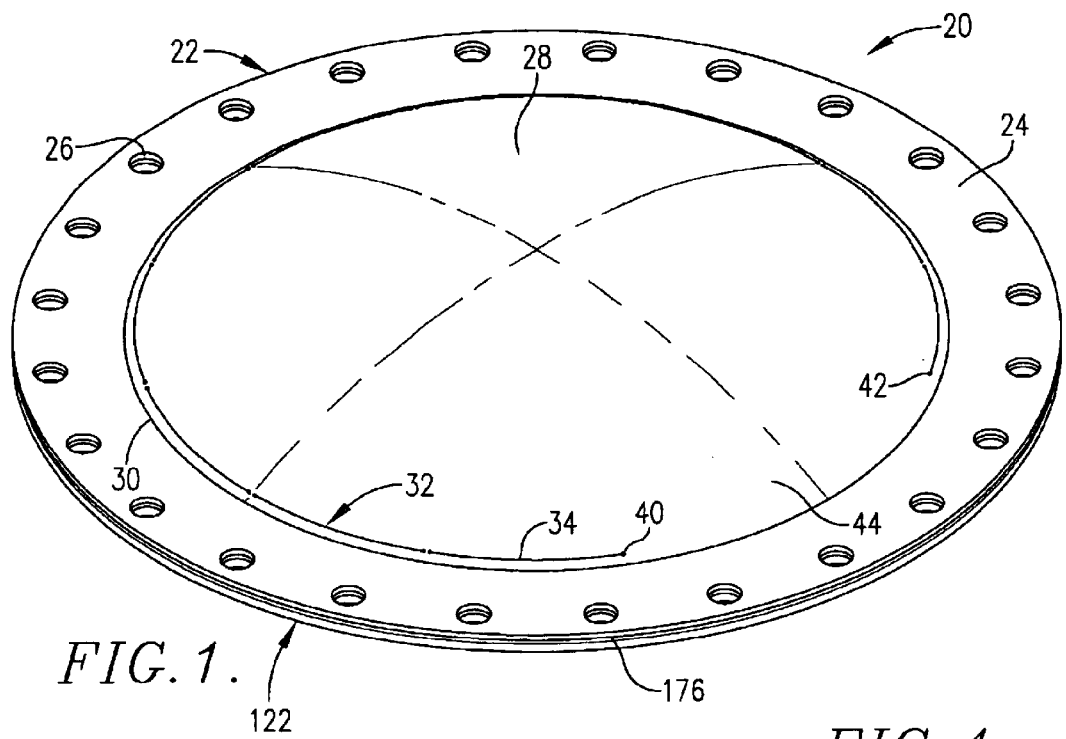
FIG.1.
FIG.4.
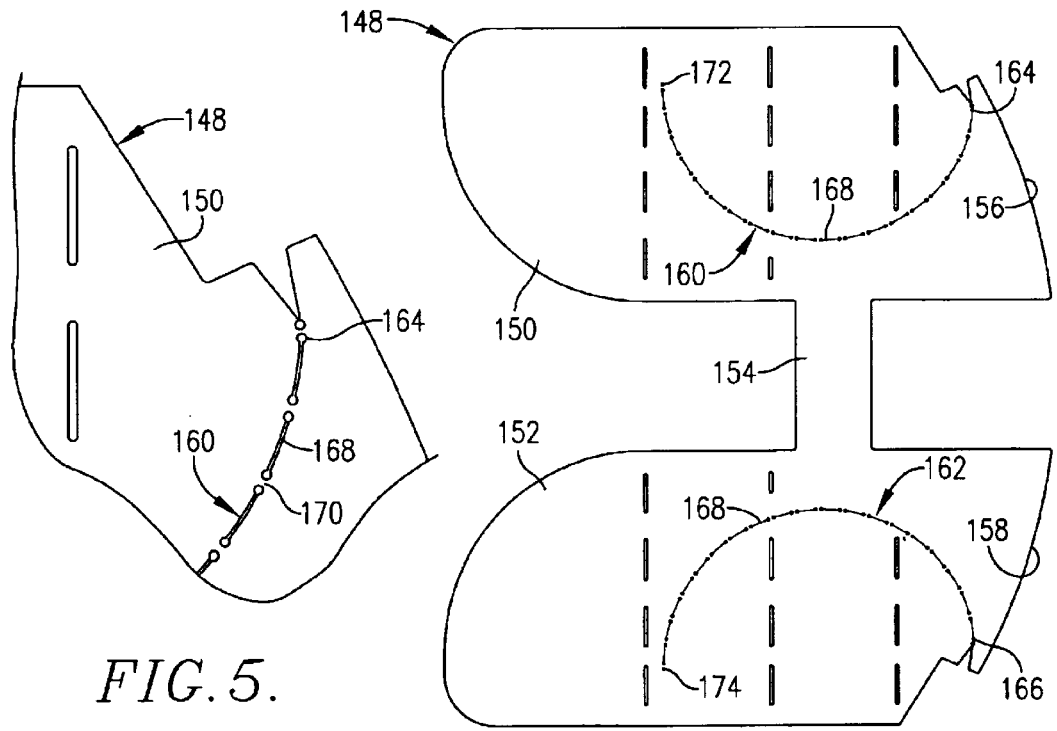
FIG.5.

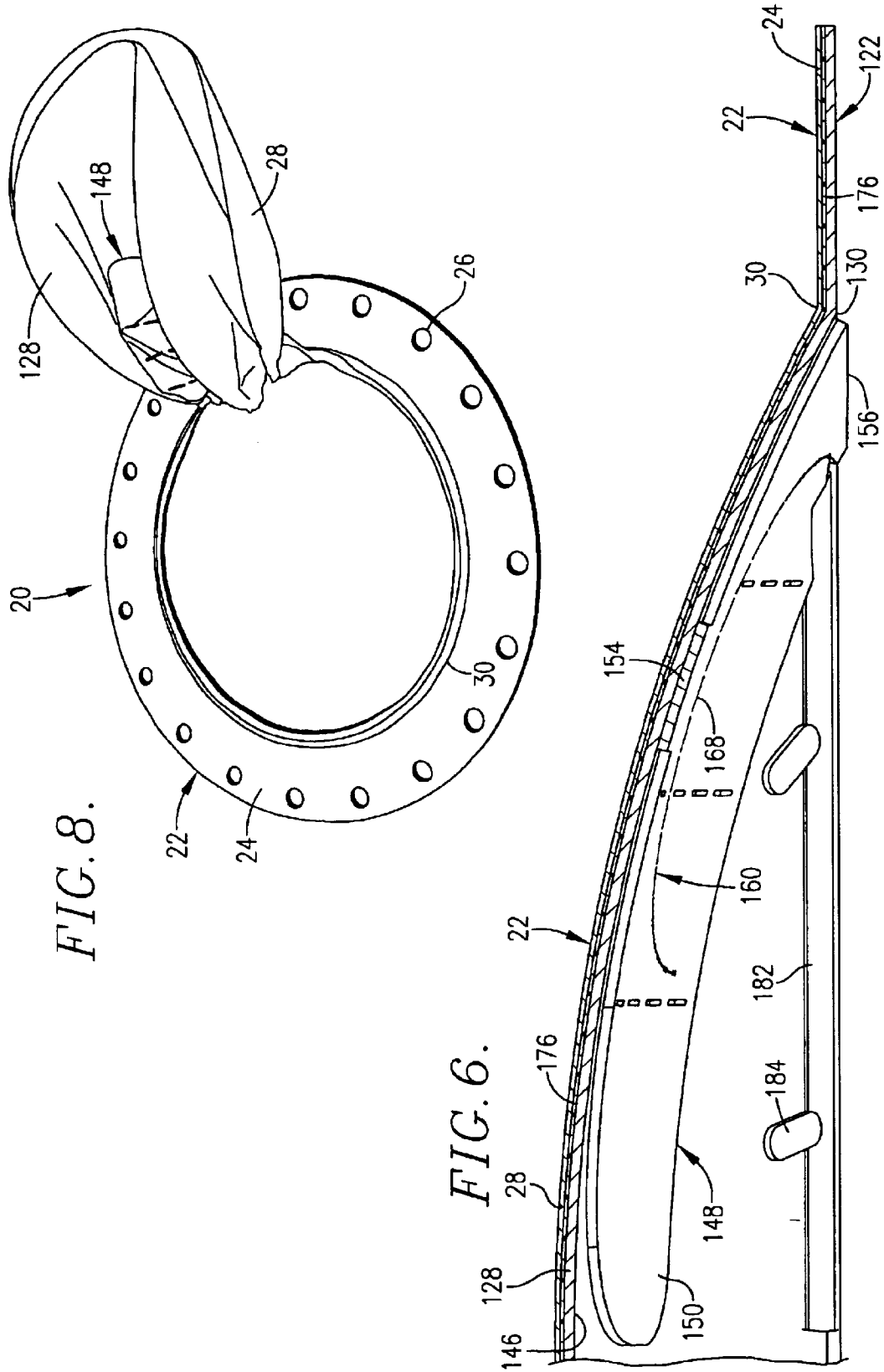

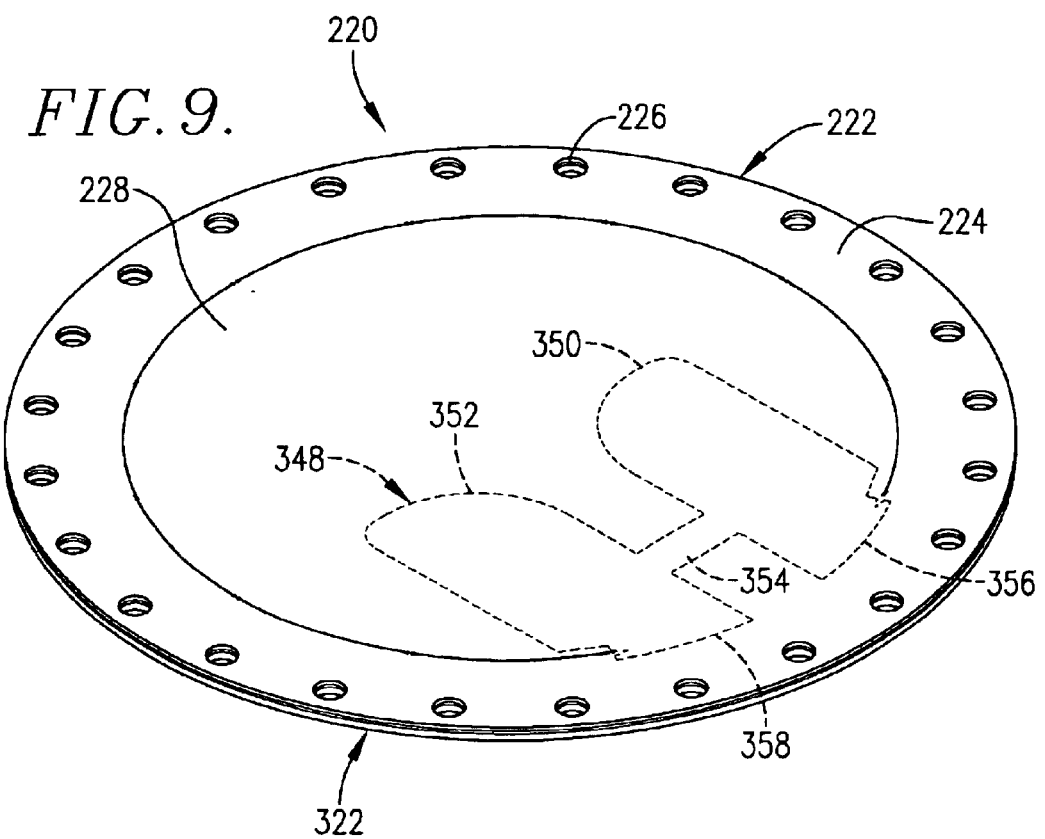
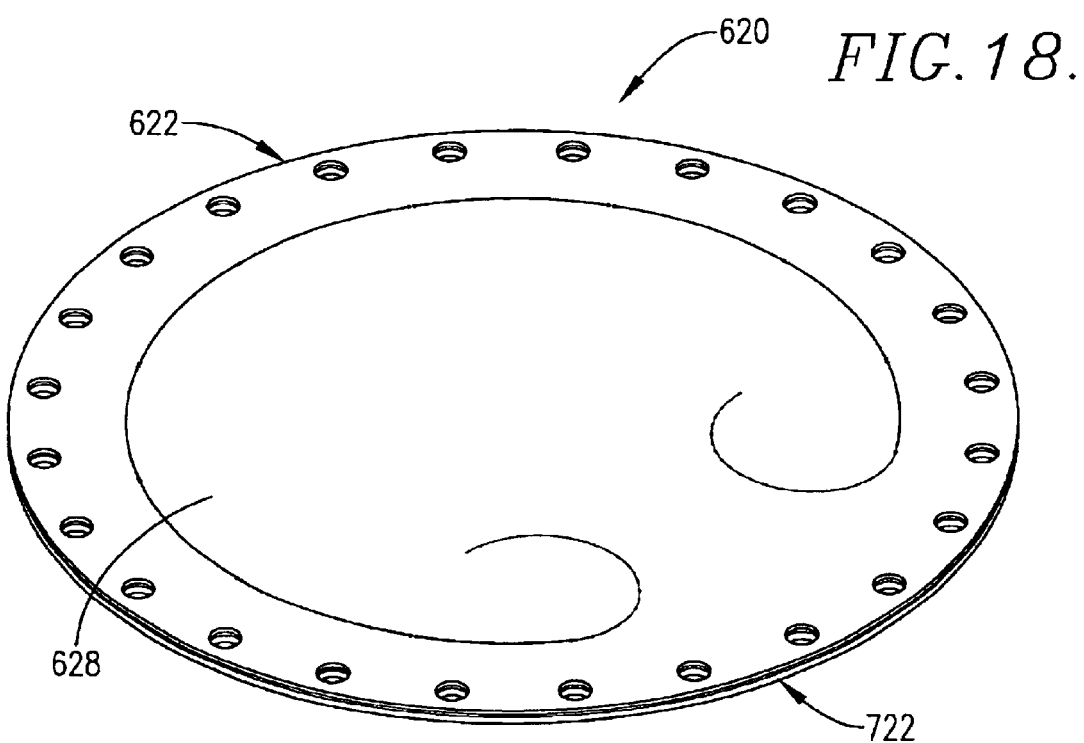

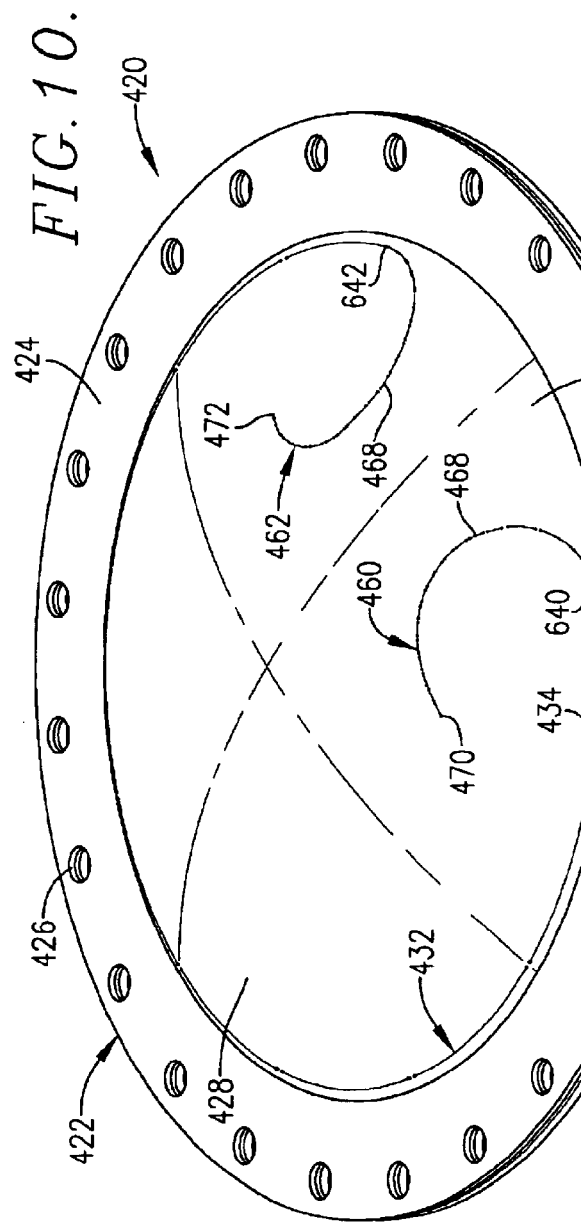
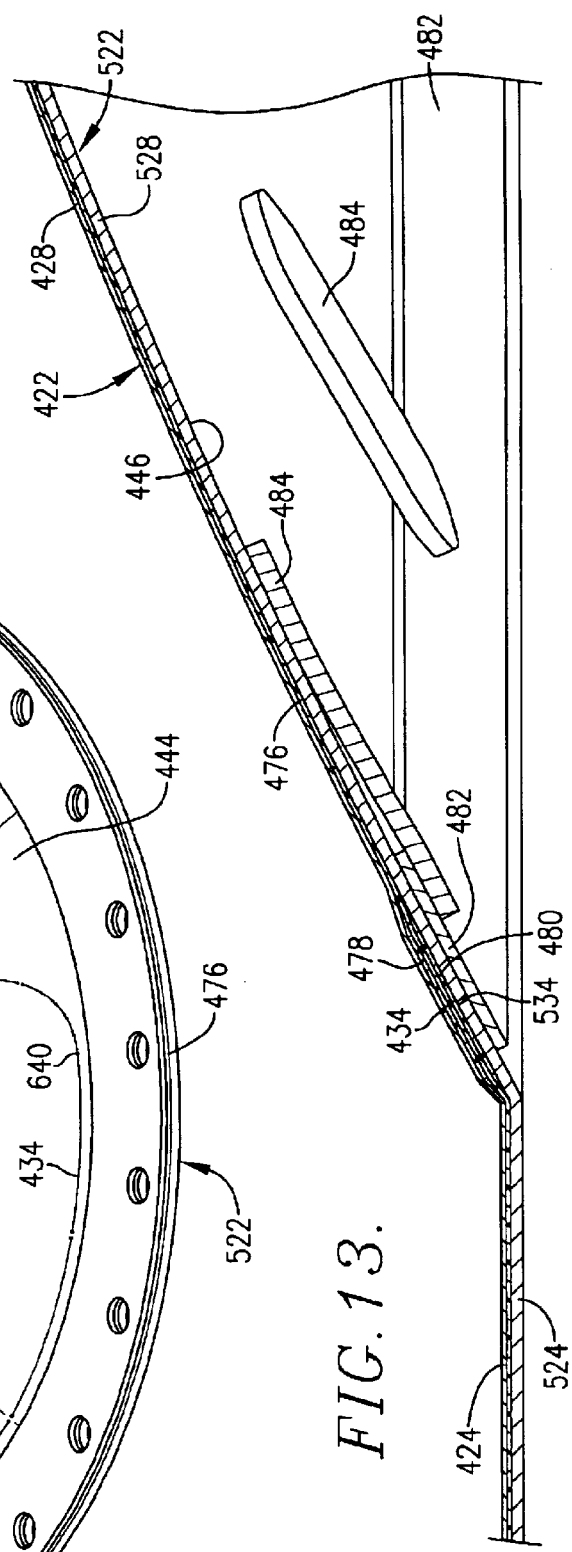

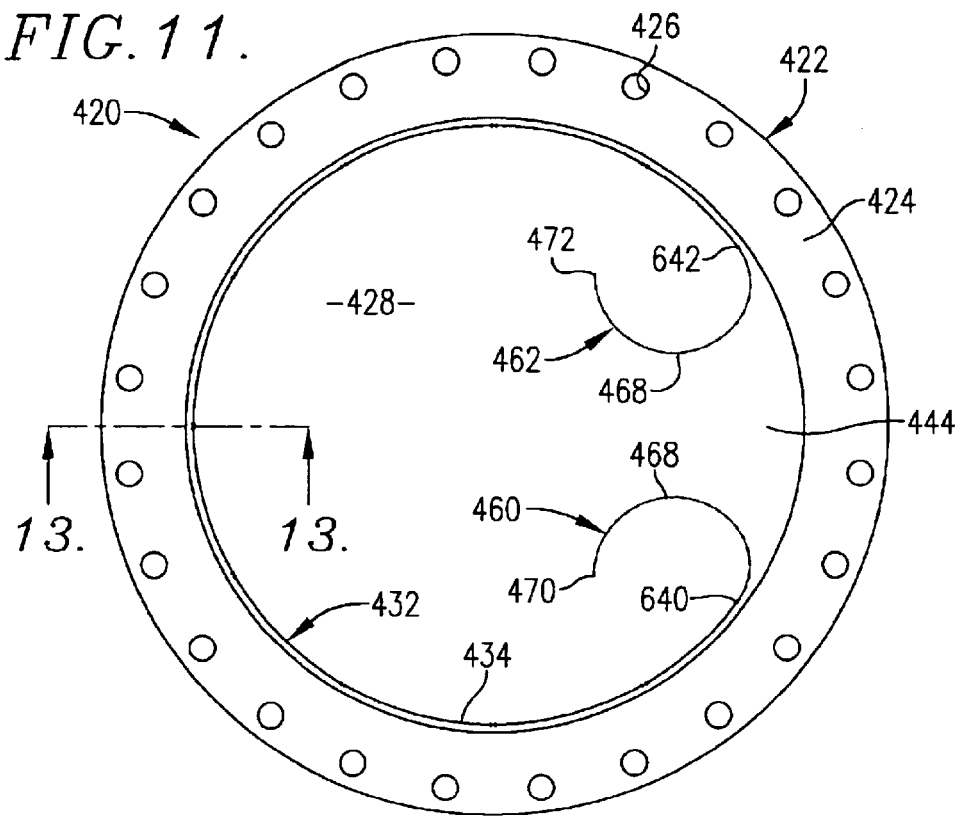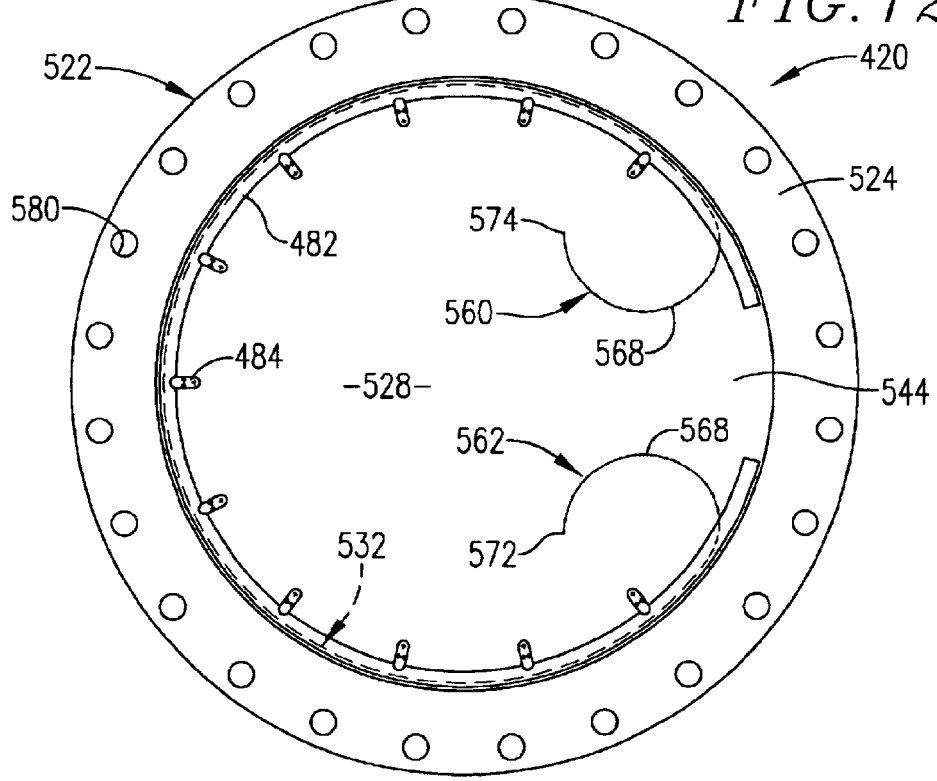

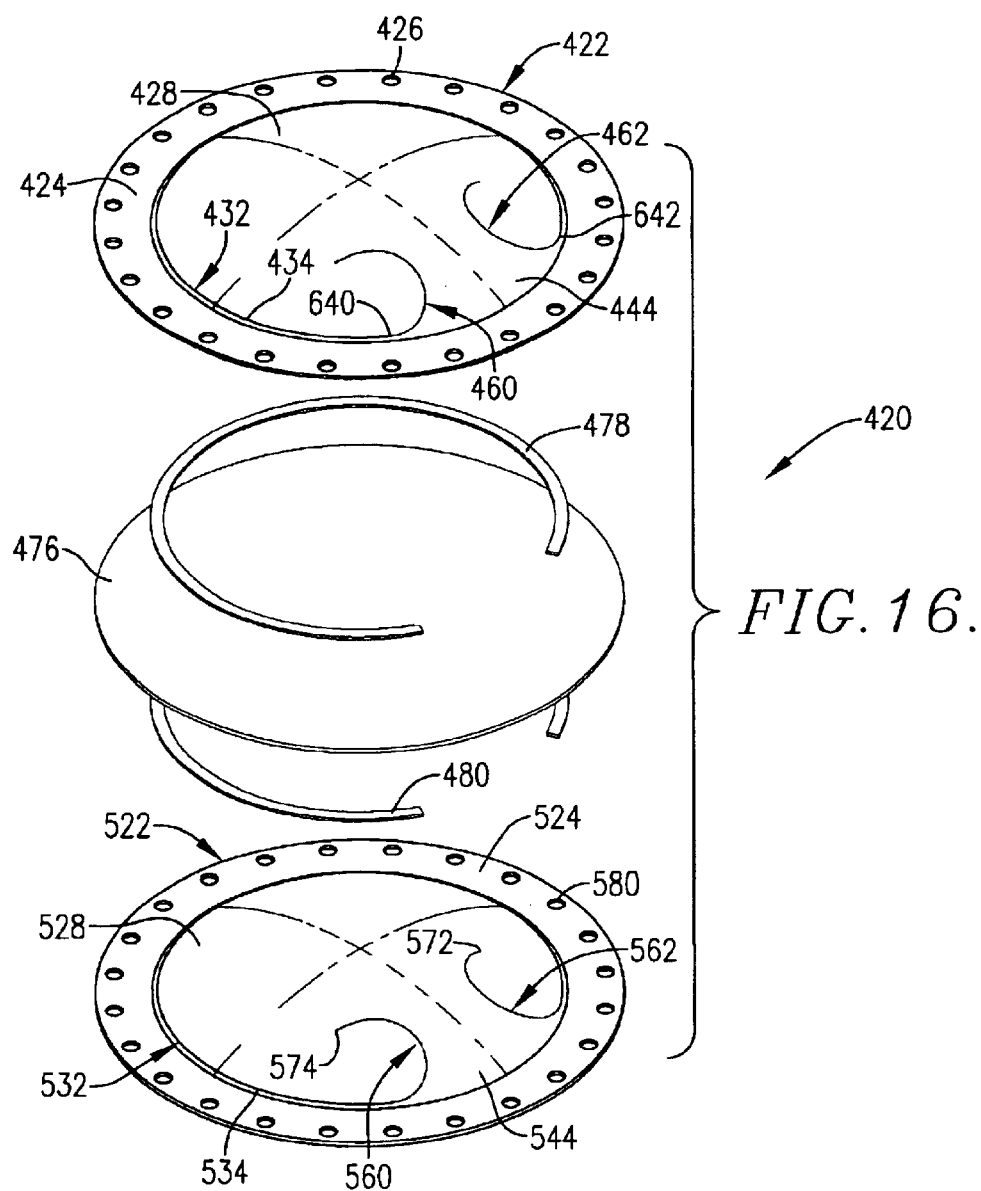
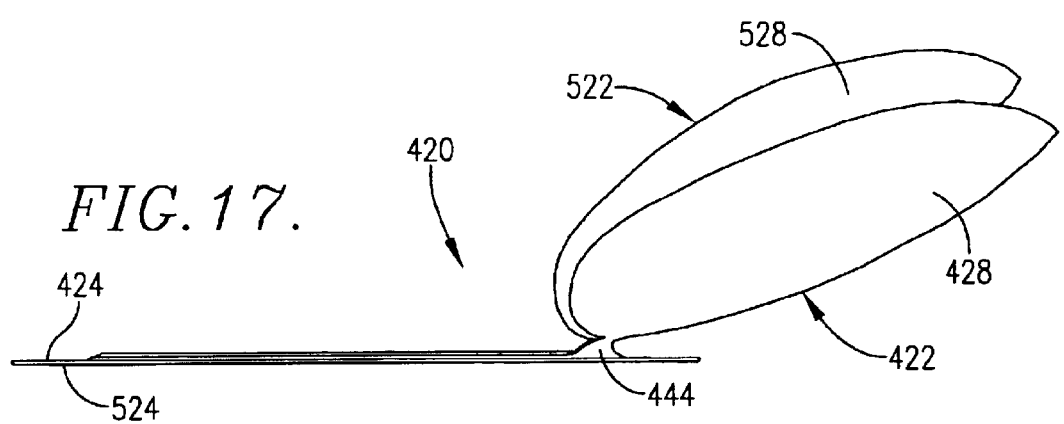

NON-FRAGMENTING PRESSURE RELIEF APPARATUS

BACKGROUND OF THE INVENTION

1. Field of the Invention

This invention relates to non-fragmenting, forward-acting pressure relief apparatus used to protect processing equipment, pressure vessels, piping and structures from high pressure events and/or to vent such equipment when destructive and catastrophic overpressures result from any media where an explosion is a risk such as gas and dust particle explosions. Explosion hazards exist in connection with various types of gases and dust particles such as coal, flour, sugar, metal, and plastics. In particular, the invention concerns a single pressure relief rupture disc and composite rupture disc apparatus designed to rupture and vent a protected area, process or equipment whenever an overpressure condition occurs that exceeds a preselected value. The pressure relief rupture disc apparatus incorporates a rupture disc or rupture disc assembly which ruptures and vents an area when overpressure condition or explosion occurs wherein the section of the rupture disc or sections of the rupture disc assembly open fully for pressure relief without fragmentation or separation of the ruptured sections of the disc or composite sections of the disc assembly from the remaining flange portion or portions of the assembly.

The non-fragmenting pressure relief apparatus is adapted for use in a variety of applications including those where cycling between positive and negative pressure in the protected system must be accommodated without rupturing of the disc or disc assembly and opening of the rupturable section of the disc or the rupturable sections of the disc assembly occurs only when a predetermined pressure value is exceeded in the protected zone.

2. Description of the Prior Art

Many industrial processes involve handling and processing of materials that under certain conditions can create hazardous overpressures resulting from explosive conflagrations, or rapid rise in pressure from runaway processes, failure of protective devices such as pressure regulating valves, and similar unpredictable mishaps. Exemplary in this respect are processes involving gases or dust particles in contained vessels or piping which can spontaneously ignite or produce an explosion from untoward events such as a spark or the like and that result in dangerous pressure build-ups within an enclosure, piping or containment vessels. Single rupture discs and composite rupture discs usually having two separate rupture discs have long been employed to protect vessels, pipes, conduits, and structures or areas from overpressure of a predetermined value.

Explosion vents have been provided for many years to cover relief openings in vessels, tanks, bag houses, and piping associated with such equipment, to relieve excess pressure before the excessive pressure damages equipment, components, or structures where the equipment is in operation. Bag houses or the like that are constantly at risk of explosions by virtue of the high concentration of dust within the bag house. Typically bag houses are constructed with one or more pressure relief openings having explosion vents closing each relief opening. The explosion vents seal the openings when the bag houses operate at normal positive or negative pressures and then burst or open when the bag houses are subjected to a pressure build up of a predetermined excess magnitude to uncover the openings and thus vent the interior of the bag houses. To prevent premature or a late bursting, explosion vents must be designed to consistently burst at a particular pressure level. The same type of hazard must also be safely controlled in connection with processing equipment involving combustible gases or dust particles, pipes conveying gases or dust laden fluids from one part of a process to another or to a collection area, processing vessels in which a runaway reaction or untoward build-up of pressure in the vessel can occur without warning, and other industrial processes where an uncontrolled explosion or excessive build-up of pressure is a continuing safety hazard.

Pressure relief apparatus also must accommodate cycling between positive and negative pressure conditions in the equipment, piping, or vessels that require overpressure protection. To this end, it has been conventional to provide rupture disc apparatus in which a rupturable section of the apparatus includes a central bulged area presenting opposed convex concavo surfaces with the concave surface facing the protected zone. This forward acting bulge rupture disc is better able to withstand vacuum conditions within the protected zone than is the case with a flat rupture disc. In addition, pressure relief rupture disc assemblies have included a pair of rupturable central areas with one of the rupture discs being of thicker material than the other rupture disc. In the case of bulged rupture discs, the concavo-convex areas of the discs are in complemental aligned relationship.

Many of the pressure relief devices in the past and present use have been provided with lines of weakness defining the rupturable section of both flat and bulged discs. The lines of weakness are semi-circular in the case of circular discs and rectangular in the instance of rectangular rupture discs. The lines of weakness have been either score lines in one surface of a respective disc defining the rupture area thereof, or a series of elongated slits extending through the rupture disc material with unitary disc webs separating the ends of adjacent elongated slits. Where slits through the disc material are provided defining lines of weakness, a layer of rupturable material, usually a flexible synthetic resin film or the like, is positioned in overlying relationship to the series of slits in order to prevent leakage of fluid therethrough until such time as rupture of the section of the disc defined by the line of weakness occurs. Exemplary pressure relief rupture disc structures in this respect have been provided with two rupture discs in complemental overlying relationship with a layer of flexible material interposed between adjacent surfaces of the rupture discs and an additional strip of flexible material directly overlying a corresponding line of weakness.

The lines of weakness, whether in the form of a score line, or a series of elongated slits defining a line of weakness, do not extend around the entire perimeter of the rupture portion of the disc defined by the line of weakness, but have opposed ends in spaced relationship which present a unitary hinge for the rupturable section of the disc to retain the ruptured portion of the disc with the flange portion thereof, and thereby avoid fragmentation of the disc with attendant released metal fragment hazards in the area surrounding the location of the pressure relief apparatus.

Notwithstanding the provision of anti-fragmentation hinge portions of the rupture discs structures of previous designs, the construction of such hinge areas has not been totally satisfactory to accommodate a multiplicity of overpressure events and conditions. If the width of the hinge area is too great, the pressure value at which the rupturable section gives way is often times compromised resulting in failure of the rupture disc to open at a pre-selected value. On the other hand, if the hinge area is narrowed in order to assure full opening of a rupture disc at a prescribed pressure value, the unitary hinge area tends to also rupture allowing the section of the disc which opens to tear away from the surrounding remaining flange portion of the disc and thereby produce a resultant dangerous metal projectile escaping from the rupture disc assembly at high velocity.

Therefore, there has been and continues to be a need for pressure relief rupture disc apparatus which will reliably open at a preset overpressure value yet is resistant to fragmentation of the ruptured area of the disc upon opening of the disc. It is also desirable that the design of the explosion protection rupture disc assembly be applicable to a wide range of vent openings and different prescribed rupture pressures dependent solely upon materials of construction, thickness of the material and whether the central section is bulged or not, without it being necessary to provide a multiplicity of specifically engineered hinge construction designs in order to prevent fragmentation of the rupturable section of the disc.

SUMMARY OF THE INVENTION

Non-fragmenting, forward-acting pressure relief apparatus in accordance with this invention includes either a single rupture disc, or a pair of rupture discs, each having a central section and a peripheral flange section. The apparatus is adapted to be mounted on structure defining a vent opening communicating with structure or equipment to be protected from overpressure events.

Certain embodiments of the invention have a single bulged or flat disc, while other embodiments include two complemental bulged or flat discs. In one embodiment of a single bulged or flat disc, the single disc, or the two discs in overlying complemental relationship, each have a line of weakness which defines the central section of each disc that ruptures and opens upon application of pressure of a predetermined magnitude to the central section of the disc. The rupturable line of weakness in each of these discs includes a major segment extending around the central section of the disc, and generally C-shaped end region lines of weakness, which are extensions of the terminal ends of the major segment of the line of weakness. The opposed C-shaped end region lines of weakness that first converge toward one another and then diverge away from one another, cooperate to define a hinge portion of the central section of the disc. In the case of two superimposed rupture discs, whether flat or bulged, the lines of weakness in respective rupture discs are aligned with each other.

Upon application of a force to the central section of the disc or discs sufficient to effect rupture of the line of weakness of each, the central section or sections of the discs defined by the line of weakness opens to vent the area of the equipment or structure protected by the pressure relief apparatus. Severing of the hinge area of the central section of each disc is precluded by virtue of the manner in which the forces on the end regions of the line of weakness which effect rupture thereof, are diverted away from the minimum width of the hinge area between the end regions of the line of weakness. In view of the fact that the end regions of each line of weakness are of semi-circular C-shaped configuration and therefore continuously converge toward one another and continuously diverge away from one another has the effect of diverting forces tending to severe the hinge area of each disc away from the minimum width of the hinge area upon opening of a respective rupture disc, thus preventing separation of the central sections of the discs from the flange portions of respective discs.

In another preferred embodiment of the vent apparatus, separate reinforcement panels are secured to one face of the central section of a disc (the concave face of the disc in the case of a disc having a bulged central section), with the C-shaped end regions of the line of weakness being provided in respective panels. In one version of this embodiment, the terminal ends of the main length of the line of weakness in the central section of the disc join with ends of opposed C-shaped, first converging and then diverging end region lines of weakness. In another version of this embodiment, two separate rupture discs are provided with the first overlying disc having only a main length of line of weakness without C-shaped end region lines of weakness. The second associated rupture disc has wing panels, which may be a part of a butterfly shaped member, secured to a surface of the disc remote from the first disc and is provided with opposed, C-shaped end region lines of weakness that extend from points that align with the terminal ends of the main line of weakness in the central section in the overlying first rupture disc. In view of the fact that the part of the underlying second disc having the panels secured thereto is of greater thickness than the remainder of the central section of that disc, additional reinforcement is provided for the hinge portion of the disc, which in conjunction with the curvilinear, outwardly diverging configuration of the end region lines of weakness, enhances prevention and tearing and severing of the hinge portion of the central section of the disc.

The lines of weakness in all embodiments of this invention are preferably defined by a series of end-to-end spaced slits through the thickness of the central section of each disc having unitary webs of the central section of a respective disc between adjacent ends of each of pair of slits. Upon application of a force against the central rupturable section of the discs of all embodiments of this invention sufficient to tear the unitary webs of disc material between adjacent ends of the slits defining the line of weakness, the rupturable sections of the discs open to vent the area protected by the pressure relief apparatus. Although the lines of weakness tear along the full length thereof upon rupture of the central section of the disc, including the outwardly diverging C-shaped end region lines of weakness, the hinge portions of the central sections of the discs are protected from tearing or severing because the forces effecting rupture of the webs between the individual end region line of weakness defining slits in the rupture discs tear in opposite directions away from the hinge portions of the rupture disc thus maintaining the integrity of the hinge portions of the central sections of the discs even though very high pressures are applied to the central sections of the disc upon occurrence of an overpressure or explosion, resulting in substantially instantaneous opening of the rupture discs.

BRIEF DESCRIPTION OF THE DRAWINGS

FIG. 1 is a perspective view of non-fragmenting, forward-acting pressure relief apparatus adapted to be mounted in closing relationship to an opening communicating with structure or equipment to be protected from an overpressure condition with a pair of centrally bulged rupture discs being provided, each of which has a slit defining line of weakness;

FIG. 4 is an enlarged fragmentary plan view of the butterfly shaped support element having C-shaped, outwardly diverging end region lines of weakness in opposed panel portions of the support element;

FIG. 5 is an enlarged fragmentary view of the upper right corner of the butterfly shaped support element as shown in FIG. 4 of the drawings;

FIG. 6 is a fragmentary enlarged vertical cross-sectional view taken substantially on the line 6—6 of FIG. 2 and looking in the direction of the arrows;

FIG. 8 is a diagrammatic representation of the vent apparatus as illustrated in FIG. 1 showing the central sections of the discs in their open position after rupture of the lines of weakness in the central sections of the rupture discs;

FIG. 9 is a perspective view of alternate non-fragmenting pressure relief apparatus in which the central section of each of the rupture discs is flat rather than being bulged, with the butterfly shaped element that has C-shaped, first converging and then diverging end region lines of weakness mounted on the underside of the bottom rupture disc being shown by dashed lines;

FIG. 10 is a perspective view of another alternate form of the non-fragmenting pressure relief apparatus that does not have a butterfly shaped support element on the bottom side of the rupture disc, but instead has C-shaped end line of weakness regions in both of the rupture discs;

FIG. 11 is a plan view of the pressure relief apparatus as shown in FIG. 10;

FIG. 12 is a bottom view of the pressure relief apparatus as shown in FIG. 10;

FIG. 13 is an enlarged fragmentary cross-sectional view taken substantially on the line 13—13 of FIG. 11 in looking in the direction of the arrows;

FIG. 14 is a enlarged fragmentary plan view illustrating a pair of end-to-end slits defining the line of weakness in the central section of the rupture discs of this invention and illustrating the terminal ends of the slits defined by enlarged circular areas separatedted from one another by a web that is unitary with the central section of the disc;

FIG. 16 is an exploded perspective view of the embodiment of the invention having bulged rupture discs as illustrated in FIG. 10 of the drawings;

FIG. 17 is a schematic representation of the non-fragmenting pressure relief apparatus of FIG. 16 in which the central sections of the rupture discs have opened but have not undergone fragmentation by severing from the peripheral portions of the rupture disc at the hinge areas thereof; and FIG. 18 is a perspective view of alternate non-fragmenting pressure relief apparatus in which the central section of each of the pair of rupture discs is flat rather than being bulged, with each of the discs having aligned, C-shaped end region lines of weakness which are extensions of the principal line of weakness around the central section of each disc.

DETAILED DESCRIPTION OF THE PREFERRED EMBODIMENTS

Figure 2:
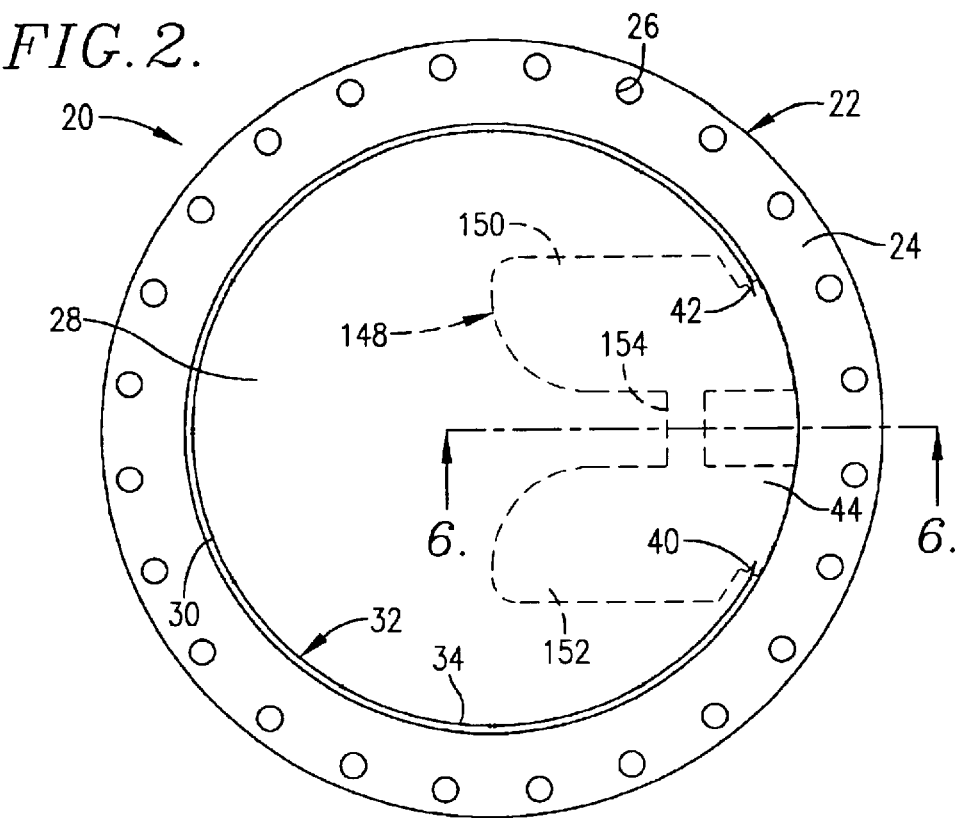
FIG. 2 is a plan view of non-fragmenting pressure relief apparatus as shown in FIG. 1, wherein a butterfly shaped support element that is provided on the underside of the bottom rupture disc is shown in dashed lines.

Non-fragmenting pressure relief apparatus in accordance with one preferred embodiment of this invention as shown in FIGS. 1–8 of the drawings, generally designated 20, is adapted to be mounted in overlying relationship to an opening leading to equipment or structure to be protected from a preselected overpressure condition. Apparatus 20 is especially useful for protecting processing equipment, pressure vessels, piping and structures including bag houses and the like from overpressures resulting from explosions and other potentially destructive and catastrophic high pressure occurrence. Although apparatus 20 is illustrated in the drawings as of circular configuration, the principals hereof are also applicable to rectangular or other polygonal non-fragmenting pressure relief apparatus.

Apparatus 20 includes a topmost or outermost rupture disc 22 normally constructed of a relatively thin corrosion resistant metal material such as stainless steel. Disc 22 in its circular embodiment includes an annular flange 24 generally provided with a series of circumferentially extending, spaced openings 26 oriented to receive respective hold-down bolts (not shown) which serve to clamp apparatus 20 to support the structure forming a part of or connected to structure or equipment to be protected from an untoward overpressure event or condition such as explosion.

In the embodiment of apparatus 20, the central section 28 of rupture disc 22 is unitary with the circumscribing flange portion 24 thereof. The bulged central section 28 of rupture disc 22 is preferably formed by bulging the disc in a tool (not shown) that has an inner opening of a diameter equal to what becomes the transition zone 30 between central bulged section 28 and unitary flange portion 24. Thus, the bulge formed in central section 28 of rupture disc 22 is generally semi-hemispherical in configuration.

The bulged portion of central section 28 of rupture disc 22 is provided with a semi-circular line of weakness generally designated 32 extending around a part of the perimeter of bulged central section 28 inboard of but adjacent to circumscribing transition zone 30. The line of weakness 32 is preferably comprised of a series of arcuate, separate, end-to-end slits 34 each of which extends through the full thickness of the bulged portion of central section 28 of rupture disc 22. As depicted schematically in fragmentary FIG. 14, which is representative of the slit construction of all embodiments of the present pressure relief apparatus, each of the slits 34 terminates in a circular opening 36 communicating with a corresponding slit 34 and of substantially greater diameter than the width of each slit 34. Adjacent openings 36 are in spaced relationship presenting a web 38 of material that is unitary with the bulged portion of each of the rupture discs of the vent apparatus. As is most evident from FIGS. 1 and 7, each of the lines of weakness 34 is of substantially greater length than the width of respective webs 38 between adjacent slits 34. Furthermore, the opposed end extremities 40 and 42 of line of weakness 32 define a hinge portion 44 therebetween of the bulged portion of central section 28 of rupture disc 22. The arcuate length of line of weakness 32 between end extremities 40 and 42 thereof may be varied depending upon a number of variables such as material thickness, the burst pressure parameter, the type of relief apparatus, and process conditions. In one preferred embodiment, the arc of line of weakness 32 extending from end extremity 40 to end extremity 42 may for example be from about 290 degrees to about 295 degrees.

Figure 7:
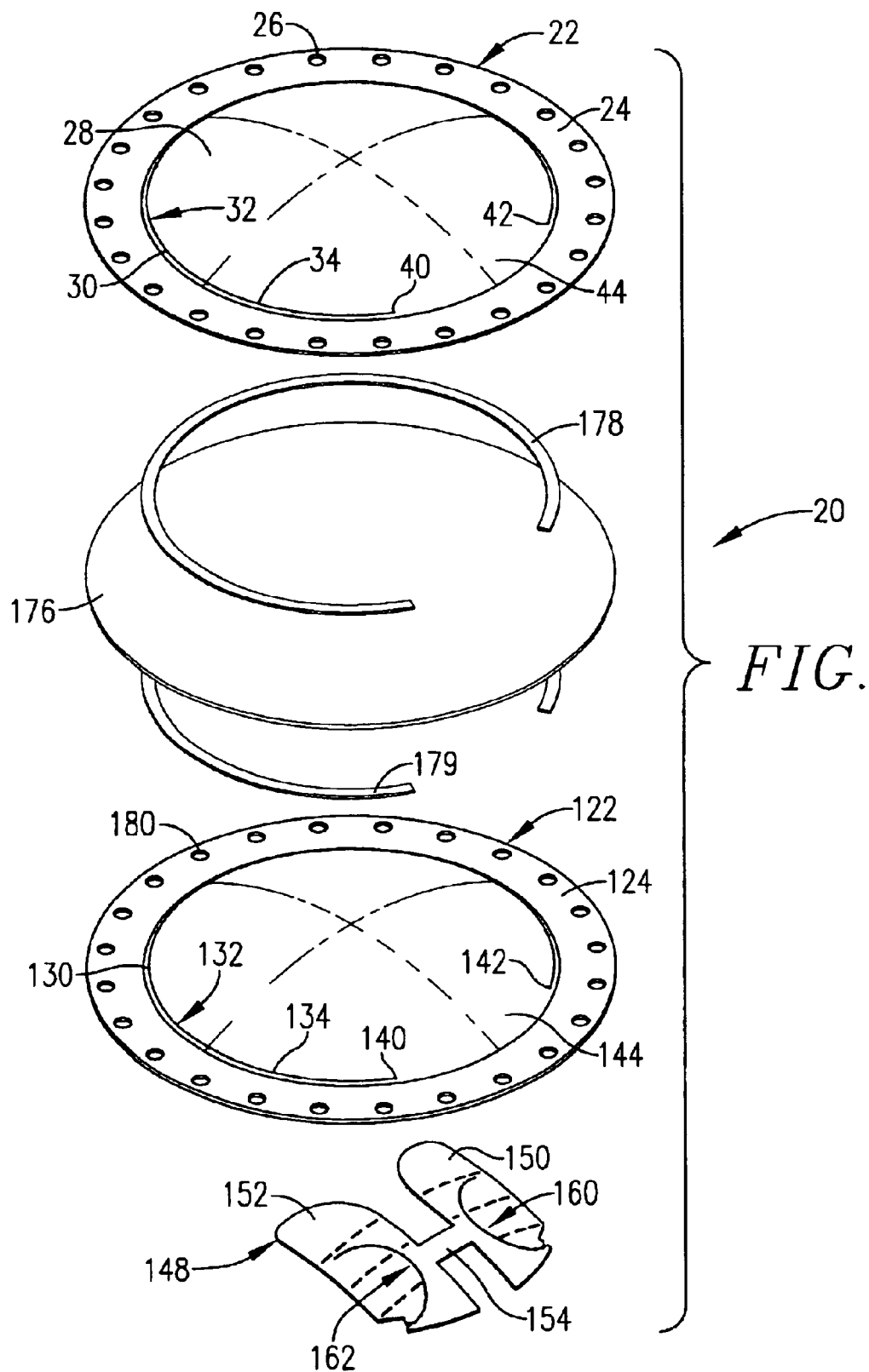
FIG. 7 is an exploded view of the embodiment of the vent apparatus as shown in FIG. 1.
Figure 15:
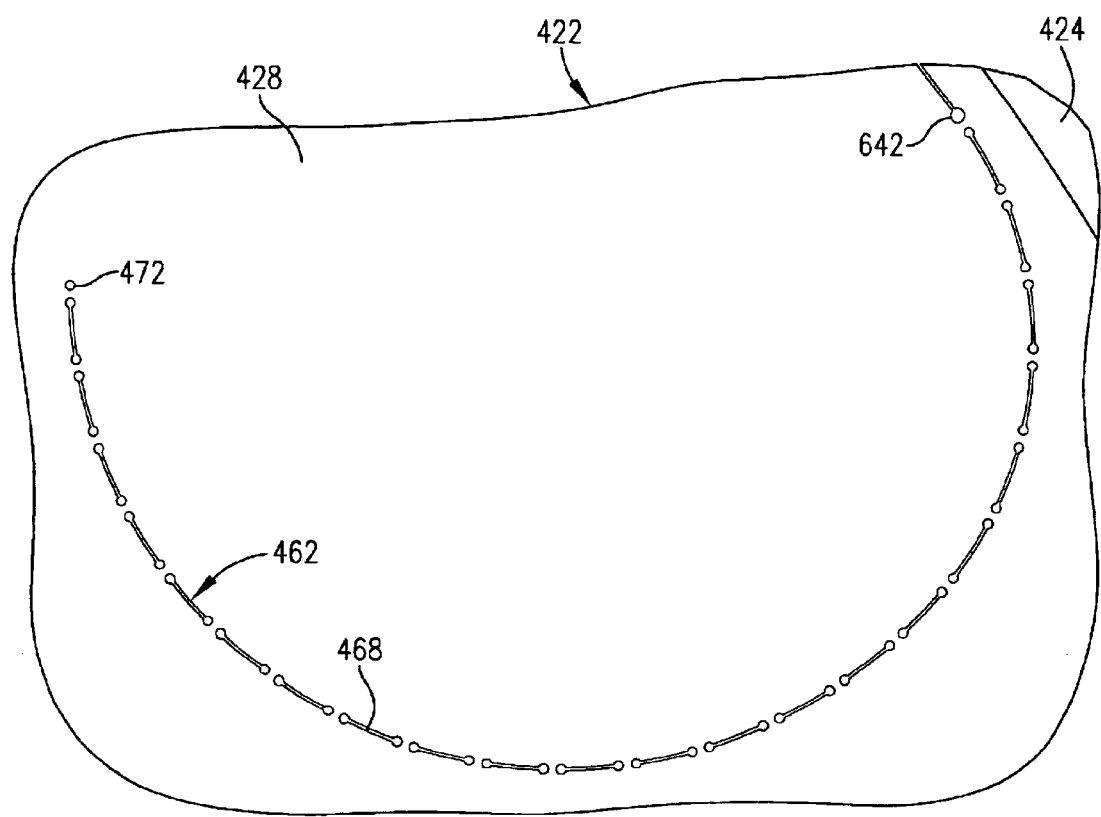
FIG. 15 is a fragmentary enlarged portion of the central section of one of the rupture discs illustrated for example in FIG. 11, and illustrating the C-shaped end region of the line of weakness in the central section of the disc.

As is best shown in the exploded view of FIG. 7, apparatus 20 includes a second rupture disc 122 which is of identical shape and overall dimensions as disc 22, but preferably is constructed of somewhat thicker stainless steel material. The bulged portion of the central section 128 of rupture disc 122 is unitary with the peripheral flange portion 124 of rupture disc 122 which merges with bulged section 128 at circumscribing transition zone 130. The bulged section 128 of rupture disc 122 has a line of weakness 132 adjacent to but spaced from transition zone 130. In the case of a rupture disc such as disc 122 having a bulged central section 128, the line of weakness 132 may be defined by a continuous, uninterrupted slit 132 through the thickness of the disc material and extending between end extremities 140 and 142. Alternatively, line of weakness 132 may be defined by a series of separate, arcuate elongated slits 134 which are separated one from another by webs identical to material webs 38 illustrated in FIG. 14. A continuous uninterrupted line of weakness slit 132 is provided most often in a disc having a bulged section 128 depending upon the material thickness of disc 122, whereas an interrupted line of weakness having a series of separate slits 134 is most often provided in a flat rupture disc such as disc 122. Thus the provision of a continuous uninterrupted line of weakness making up slit 132 in rupture disc 122, or a line of weakness 132 defined by a series of separate elongated, arcuate slits is dependent upon a particular application such as material thickness, process conditions and the pressure relief apparatus.

In addition, it is to be understood that the line of weakness 132 is directly aligned with line of weakness 32 when the discs 22 and 122 are positioned in superimposed complemental relationship with the bulged portion of central section 128 of disc 122 nested in the bulged portion of central section 28 of disc 22. The line of weakness 132 maybe the same arcuate length as line of weakness 32, and generally directly aligned with line of weakness 32. The line of weakness 132 may be the same arcuate length as line of weakness 32 or may be of different arcuate length. The end extremities 140 and 142 of line of weakness 132 cooperate to define there between a hinge portion 144 generally aligned with hinge portion 44 of overlying rupture disc 22. The hinge portion 44 of rupture disc 22 and the hinge portion 144 of rupture disc 122 may be the same width, or of different widths depending upon the respective arcuate lengths of lines of weakness 32 and 132 respectively. Thus, the arcuate length of lines of weakness 32 and 132 controls the width of respective hinge portions 44 and 144 of discs 22 and 122, with the relative length of lines of weakness 32 and 132 and consequent width of hinge portions 44 and 144 being varied dependent upon the material thickness of discs 22 and 122, process conditions and pressure relief apparatus.

The concave face 146 of the bulged portion of the central section 128 of disc 122 is provided with a butterfly shaped support element 148 has two wing panels 150 and 152 of generally trapezoidal configuration that are joined by a unitary central cross-sector 154. The support element 148 is spot welded to face 146 of the bulged portion of central section 128 of rupture disc 122 in disposition such that sector 154 is located midway between the end extremities 40 and 42 of line of weakness 32 of rupture disc 22, as well as hinge portion 144 of the bulged portion of central section 128 rupture disc 122 midway between end extremities 140 and 142 of line of weakness 132.

Figure 3:
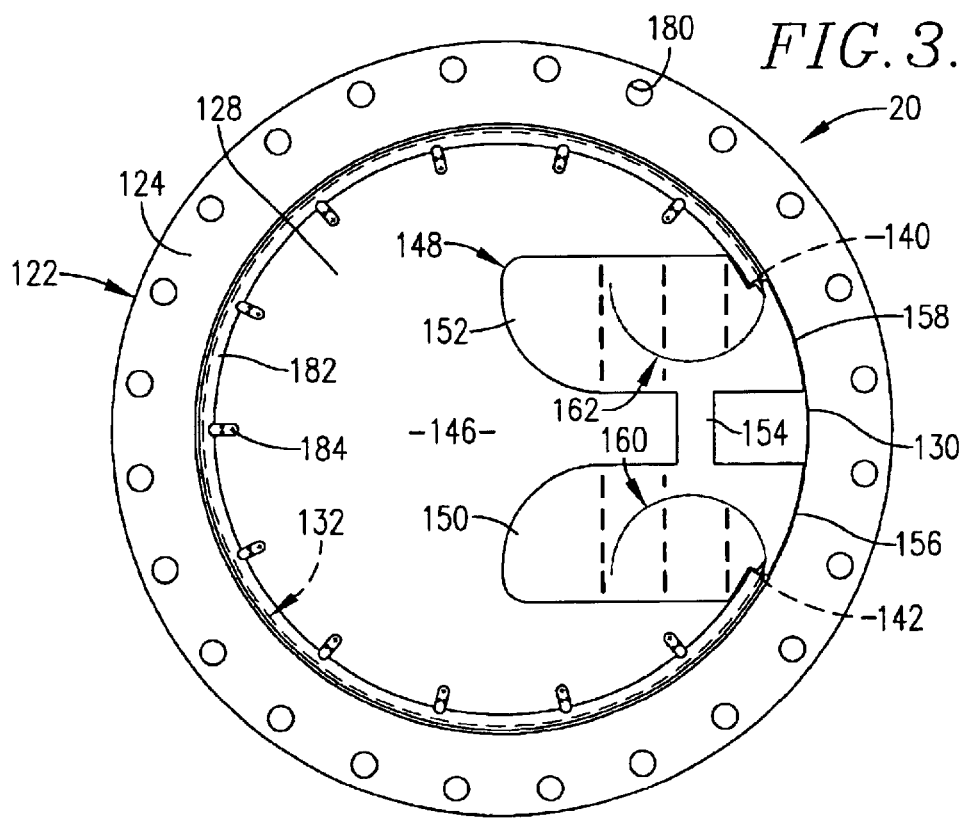
FIG. 3 is a bottom view of the pressure relief apparatus shown in FIG. 2, wherein the butterfly shaped support element mounted on the underside of the bottom rupture disc has generally C-shaped, outwardly diverging end region lines of weakness in opposed panel portions of the support element.

The orientation of butterfly support element 148 with respect to central section 128 of rupture disc 122 can best be observed in FIG. 3 of the drawings. It can be observed from FIG. 3, that the support element 148 is located beneath rupture disc 122 on face 146 thereof in disposition such that the arcuate outermost edges 156 and 158 of panels 150 and 152 respectively, are of generally aligned with the transition zone 130 of rupture disc 122. Furthermore, it is apparent from FIG. 3, that the arcuate edges 156 and 158 of panels 150 and 152 depicted in FIG. 4, are generally complemental to and conform with the arcuate configuration of corresponding adjacent segments of transition zone 130 of rupture disc 122. It is also to be understood in this respect that the butterfly shaped support element 148 is configured to conform to the semi-hemispherical shape of the face 146 of rupture disc 122. Referring to FIGS. 4 and 5, and to FIG. 3 for orientation purposes, it is to be noted that each of the panels 150 and 152 is provided with semi-circular, generally C-shaped end region lines of weakness 160 and 162 respectively oriented such that the end 164 of circular line of weakness 160 is adjacent to the end 142 of line of weakness 132. Similarly, the end 166 of semi-circular end region line of weakness 162 is in generally alignment with the end 140 of line of weakness 132 of rupture disc 122.

Each of the end region lines of weakness 160 and 162 is made up of a series of slits 168 that extend through the thickness of respective panels 150 and 152 with individual adjacent slits 168 being separated by webs 170 that are unitary with the material making up support element 148. It can also be seen from FIG. 4 as compared with the depiction of FIG. 7, that the slits 168 are substantially shorter than each of the slits 134 of line of weakness 132. Most importantly, the opposed end region lines of weakness 160 and 162 in panels 150 and 152 of support element 148 converge toward one another at the central part of each of the end region lines of weakness 160 and 162, and then diverge as the ends 172 and 174 of respective end region lines of weakness 160 and 162 are approached. Accordingly, the narrowest dimension between opposed semi-circular end region lines of weakness 160 and 162 is generally at the mid-point of corresponding end region lines of weakness 160 and 162.

A layer 176 of synthetic resin material such as Teflon is interposed between disc 22 and disc 122 for blocking leakage of air or other fluids through the slits forming a line of weakness 32 and 132 in each of the discs 22 and 122. Desirably, relatively narrow semi-circular strips 178 and 179 also of synthetic resin material such as Teflon are positioned between layer 176 and disc 22 and layer 176 and disc 122 respectively in alignment with respective lines of weakness 32 and 132. Strips 178 and 179 may be adhesively secured to corresponding opposed faces of central section 28 and central section 128 of rupture discs 22 and 122 in direct alignment with respective lines of weakness 32 and 132. Thus when the components of vent apparatus 20 are assembled, the bulged portion of central section 128 of rupture disc 122 rests within the bulged portion of the section 28 of rupture disc 22 with respective concave and convex faces thereof separated only by Teflon layer 176 and strips 178 and 179.

It is desirable, but not mandatory in connection with all embodiments of the vent apparatus of this invention that a semi-circular vacuum support ring 182 as shown in FIG. 6, be provided in underlying relationship to the rupture disc 122 in alignment with the slits 132 of the bulged portion of central section 128 of rupture disc 122. The opposed, spaced ends of vacuum ring 182 clear and do not overly the hinge portion 144 of the bulged portion of the central section 128 of rupture disc 122. Optionally, a series of spaced, radially extending tabs 184 may be spot welded to central section 128 on the underside of the bulged portion of the central section 128 of rupture disc 122 in partially supporting relationship to the bulged portion of the central section 128 of rupture disc 122 to thereby increase the reversal resistance of the bulged portions of central sections 28 and 128 of rupture disc 22 and 122 under vacuum conditions imposed on vent apparatus 20.

Non-fragmenting pressure relief apparatus 220 as shown in FIG. 9 is the same as apparatus 20 except the rupture discs 222 and 322 are flat and do not have central bulged sections. Otherwise, the components of apparatus 220 are identical to apparatus 20. Accordingly, a butterfly shaped support element 348 (depicted in dashed lines in FIG. 9) is welded to the underface of the central section of rupture disc 322. The panel portions 350 and 352 of element 348, each of which is provided with a C-shaped first converging and then diverging lines of weakness (not shown) are joined by a unitary sector 354 with panels 350 and 352. Butterfly shaped element 348 is spot welded to the underface of the central section of rupture disc 322 such that the arcuate edges 356 and 358 are aligned with an imaginary circle extending around disc 322 between the central section of disc 322 and the flange portion thereof. The flange portion 224 of rupture disc 222 has bolt receiving openings 226 which align with respective openings in the flange portion of rupture disc 322 allowing securement of vent apparatus 220 to structure or equipment to be protected from an overpressure by venting the structure or equipment through an opening normally closed by vent apparatus 220.

The only operational difference between vent apparatus 20 and alternate vent apparatus 222 is the fact that vent apparatus 20 is capable of withstanding somewhat higher vacuum conditions than vent apparatus 222 because of the provision of the bulged portions of central sections 28 of rupture discs 22 and 222. In both instances, the support elements 148 and 348 contribute to the vacuum support resistance of central sections 28 and 128 of rupture discs 22 and 122, and the central sections of rupture discs 222 and 322.

In operation, and referring to apparatus 20, because vent apparatus 220 operates in the same manner, except for a vacuum support ring on the concave face of rupture disc 122 of vent apparatus 20, the assembled vent apparatus is mounted over a vent opening in structure or equipment requiring protection from explosions or untoward overpressure events with bolts passing through openings 26 and flange 24 of rupture disc 22 and openings 180 in flange portion 124 of rupture disc 122 to fixedly secure apparatus 20 over the exhaust opening. In the event of an overpressure event developing that exceeds the burst pressure of the central section 28 of rupture disc 22 and central section 128 of disc 122 as controlled by the resistance to rupture of webs 38 between slits 34 of line of weakness 32 of the central portion 28 of disc 22 and between slits 134 of line of weakness 132 of central section 128 of disc 122, and the material of panels 150 and 152 between slits 168 and 170 through panels 150 and 152, as well as the resistance provided by layer 176 of synthetic resin material and synthetic resin material strips 178 and 179, the central sections 28 and 128 of rupture discs 22 and 122 respectively open instantaneously and bend about hinge portions 44 and 144. The entire length of lines of weakness 32 and 132 respectively, as well as the end region lines of weakness 160 and 162 in support element 148 must give way for central section 28 of rupture disc 22 and central section 128 of rupture disc 122 to open and therefore exhaust the overpressure condition. Because of the semi-circular configuration of lines of weakness 160 and 162 in support element 148, the tearing forces exerted on the central section 28 of rupture disc 22 and central section 128 of rupture disc 122 are diverted away from hinge portion 44 of central section 28 of rupture disc 20 and hinge portion 144 of central section 128 of rupture disc 122. The fact that the end region lines of weakness 160 and 162 initially converge toward one another and then diverge away from one another, the extremely high forces imposed on vent apparatus 20 do not operate to sever central sections 28 and 128 from rupture discs 22 and 122 respectively that could result in creation of a very high energy projectile released from the vent opening. Contributing to the anti-fragmentation characteristics of C-shaped end region lines of weakness 160 and 162 of the provision of slits 160 and 162 of substantially smaller length than slits 34 of line of weakness 32 of central section 28 of rupture disc 22 and slits 134 of line of weakness 132 of central section 128 of rupture disc 122. The greater number of unitary material webs between the line of weakness slits of end region lines of weakness 160 and 162 offers more resistance to rupturing than the lesser number of webs of material 36 between respective slits 34 and 134, thereby offering more resistance to rupturing of end region lines of weakness 160 and 162 than lines of weakness 32 and 132, which in conjunction with the converging and then diverging configuration of lines of weakness 160 and 162 collectively contribute to the anti-fragmenting characteristics of sections 28 and 128 of rupture discs 22 and 122 respectively. FIG. 8 is a generally schematic representation of vent apparatus 20 in which central sections 28 and 128 of rupture discs 22 and 122 have opened but hinge portions 44 and 144 remain substantially intact thus preventing sections 28 and 128 of discs 22 and 122 from being torn away from corresponding flange portions 24 and 124 thereof which would be a hazard in the downstream area from vent apparatus 20, and especially with respect to any personnel that might be present in that area.

Non-fragmenting pressure relief apparatus 420 as shown in FIGS. 10, 11, 12 and 14–16 is similar in construction and operation to vent apparatus 20 and 220 as previously described, except the lower disc of the assembly does not have a butterfly shaped reinforcement element on the underside of the bottom disc. Considering vent apparatus 420 in detail, the central bulged section 428 of disc 422 is unitary with flange portion 424 thereof. The flange portion 424 of rupture disc 422 also has a series of bolt receiving openings 426 therein similar to openings 26 and flange portion 24 of rupture disc 22 of vent apparatus 20.

The central section 428 of rupture disc 422 has a line of weakness 432 defined by slits 434 that are of the same length and configuration as slits 34 in rupture disc 22. The slits 434 are thereby separated from one another by webs of material between adjacent ends of slits 432. Here again, the arcuate slits 434 are of substantially greater length than the width of webs between adjacent slits 432.

Whereas disc 22 of vent apparatus 20 has an arcuate line of weakness 32 extending around the perimeter of bulged section 28 of disc 22 adjacent transition zone 30 and terminating in respective spaced end extremities 40 and 42, the bulged portion of central section 428 of rupture disc 422 has semi-circular, generally C-shaped end region lines of weakness 460 and 462 of the same configuration as end regions 160 and 162 in panels 150 and 152 of support element 148 on face 146 of central section 128 of rupture disc 122. Accordingly, each of the end region lines of weakness 460 and 462 commence at the terminal end extremities 640 and 642 of line of weakness 432 and from that point converge and then diverge as the ends 470 and 472 thereof are approached. The end region lines of weakness 460 and 462 made up of individual slits 468 which are separated by webs unitary with central section 428 of rupture disc 422 and that extend through the thickness of central section 428 of rupture disc 422 tear and rupture with line of weakness 432 when a predetermined force is applied to the rupture disc 428. The first converging and then diverging lines of weakness 460 and 462 cooperate to define a hinge portion 444 of central section 428 of rupture disc 422.

Rupture disc 522, as shown in FIG. 16, and that underlies rupture disc 422 is of the same configuration as disc 422 and thus has a circumscribing line of weakness 532 defined by a series of slits 534 that extend through the thickness of the material making up central section 528 of rupture disc 522. The slits 534 of line of weakness 532 and central section 528 of rupture disc 522 are of the same length and oriented in the same position as slits 434 defining line of weakness 432 in central section 428 of rupture disc 422. The semi-circular C-shaped end region lines of weakness 560 and 562 in central section 528 of rupture disc 522 and defined by a series of spaced, end-to-end slits of the same length as slits 468 in central section 428 of rupture disc 422, and directly aligned with respective slits 468, also extend through the thickness of central section 528 of rupture disc 522. The end region lines of weakness 560 and 562 thereby initially converge and then diverge as respective ends 572 and 574 thereof are approached. When the components of vent apparatus 420 are assembled, the semi-circular, C-shaped end region lines of weakness 560 and 562 are directly aligned with and underlie similarly shaped arcuate lines of weakness 460 and 462 of central section 428 of rupture disc 422. Like vent apparatus 20, vent apparatus 420 has a layer 476 of synthetic resin material such as Teflon separating rupture disc 422 and 522. Semi-circular Teflon strips 478 and 480 are provided on opposite sides of layer 476 in alignment with the line of weakness 432 of central section 428 of rupture disc 42 and line of weakness 532 of central section 528 of rupture disc 522. The ends of strips 478 and 480 terminate that the commencement of end region lines of weakness 460 and 462 of rupture disc 422, and end region lines of weakness 560 and 562 of rupture disc 522.

Optionally, non-fragmenting pressure relief apparatus 420 may be provided with a semi-circular support ring 482 similar to previously described support ring 182 and spot welded to the inner face 446 of the central section 528 of rupture disc 522. Likewise, a series of circumferentially spaced tabs 484 may be provided on ring 482 to increase the vacuum resistance of rupture discs 422 and 522. The flange portion 524 of rupture disc 522 has a series of openings 580 therein that align with and receive bolts for securing vent apparatus 420 to the structure or equipment to be protected from an untoward increase in pressure occasioned by an explosion or the like.

When a force is applied to pressure relief apparatus 20 sufficient to rupture of the webs between adjacent slits of line of weakness 432 and the web material between slits 468 of end region lines of weakness 460 and 462 of rupture disc 428, and to similarly rupture the web material between slits 534 of line of weakness 532 and web material between slits 568 of end region lines of weakness 560 and 562 of rupture disc 522 and overcome the limited resistance of layer 476 and strips 478 and 480 of the Teflon synthetic resin material, the central sections 428 of rupture disc 422 and central section 528 of rupture disc 522 instantaneously give way thus providing an opening for release of the pressure exerted on vent apparatus 420. When the central sections 428 and 528 of rupture discs 422 and 522 open, the sections 428 and 528 bend about the hinge portions 444 and 544 of discs 422 and 522 without severing of central sections 428 and 528 from respective flanges 424 and 524 of rupture discs 422 and 522. In a manner similarly to previously described, the force applied to rupture discs 422 and 522 upon occasion of an explosion or the like, that force is diverted away from hinge portions 444 and 544 of rupture discs 422 and 522. The greater number of slits making up end region lines of weakness 460 and 462 of central section 428 of rupture disc 422 and end region lines of weakness 560 and 562 of central section 528 of rupture disc 522 contributes to prevention of severing of central section 428 of rupture disc 422 and central section 528 of rupture disc 522 from respective flange portions 424 and 524 as shown schematically in FIG. 16 of the drawings.

Non-fragmenting pressure relief apparatus 620 as shown in FIG. 18, is of the same construction as vent apparatus 420 except the central section 628 of rupture disc 622 and the central section of rupture disc 722 are flat rather than being bulged. Accordingly, pressure relief apparatus 620 operates in the same manner as vent apparatus 420 when an explosion or other high pressure event occurs, but vent apparatus 420 is somewhat more resistant to reversal and opening of the central sections of pressure relief apparatus 620.

Preferred embodiments of vent apparatus 20, 220, 420 and 620 may be from about 250 mm in width to as much as about 1500 mm, and be constructed to burst at anywhere from about 25 millibars to about 1 bar. For example, in the case of vent apparatus having an overall diameter of about 1015 mm, the diameter of the major line of weakness of the central section of each of the vent apparatus units may nominally be about 775 to 780 mm. Diameter of the bulged section in this instance may be about 797 mm.

Each of the rupture discs 22, 122, 222, 322, 422 and 522, 622 and 722 are preferably fabricated of 0.5 mm stainless steel any may be from about 0.15 mm to about 1.5 mm in thickness. The discs 122, 222, 422 and 622 are preferably constructed of 1.2 mm stainless steel and may be from about 0.8 mm to about 2 mm thick. The Teflon layers 176 and 476 as well as the strips 178 and 179 as well as strips 476 and 480 are preferably from material having a thickness of about 0.05 mm and may be from about 0.025 mm to about 0.25 mm in thickness. Each of the slits 34, 134, 434 and 534, as well as the slits of the vent apparatus 220 and 620 are preferably about 100 mm in length, and maybe from about 50 mm to about 150 mm long. The webs 36 between these slits are desirably about 3 mm in width.

The butterfly support elements 148 and 348 are also desirably fabricated of stainless steel material and preferably about 1.2 mm in thickness. The elements 148 and 348 may vary in thickness from about 0.8 mm to about 2 mm.

What is claimed is:

1. Non-fragmenting pressure relief apparatus comprising:
   a rupture disc having a central section and a peripheral flange section, said central section of the rupture disc having opposed faces,
   said central section of the disc being provided with a rupturable line of weakness having a segment extending around a major part of the central section of the disc,
   said segment of the line of weakness having opposed terminal extremities;
   a pair of reinforcing panels secured to one face of the central section of the rupture disc, each of said panels being aligned with a respective terminal extremity of the line of weakness segment, each of said reinforcing panels being provided with an end region line of weakness in disposition presenting an extension of respective terminal extremities of the line of weakness segment, said end region lines of weakness being in spaced relationship to define a unitary hinge portion of the central section of the disc therebetween, each end region line of weakness having an outermost end, said end region lines of weakness converging toward one another and then diverging away from one another as said outermost end of the end region lines of weakness are approached.

2. Apparatus as set forth in claim 1, wherein the end regions continuously converge toward one another and continuously diverge away from one another.

3. Apparatus as set forth in claim 1, wherein each of the end regions of the line of weakness are of curvilinear configuration.

4. Apparatus as set forth in claim 3, wherein each of said curvilinear end regions of the line of weakness is of substantially semi-circular C-shaped configuration.

5. Apparatus as set forth in claim 1, wherein said panels are a part of a butterfly shaped support element secured to said one face of the central segment of the rupture disc having a unitary sector extending between and interconnecting the panel portions thereof.

6. Apparatus as set forth in claim 5, wherein said sector of the butterfly shaped element extends across and is located in alignment with the hinge portion of the central segment of the rupture disc.

7. Non-fragmenting pressure relief apparatus comprising:

a first rupture disc having a central section and a peripheral flange section;

a second rupture disc having a central section and a peripheral flange section, each of said first and second rupture discs having a central section and a peripheral flange section, the central section of said first and second rupture discs each being provided with a rupturable line of weakness having a segment extending around a major part of the central section of respective first and second rupture discs, said line of weakness segments of the first and second rupture discs being positioned in aligned complemental relationship, the central section of one of said first and second rupture discs having opposed faces, a pair of reinforcing panels secured to one face of the central section of said one of the first and second rupture discs, each of said panels being aligned with a respective terminal extremity of the line of weakness segment in said one rupture disc, each of said reinforcing panels being provided with an end region line of weakness in disposition presenting an extension of respective terminal extremities of the line of weakness segment in said one rupture disc, said end region lines of weakness being in spaced relationship to define a unitary hinge portion of the central section of said one rupture disc therebetween, each end region line of weakness having an outermost end, said end region lines of weakness converging toward one another and then diverging away from one another as said outermost end of the end region lines of weakness are approached, the terminal extremities of the line of weakness segment of the other of said first and second rupture discs terminating at the commencement of the line of weakness end regions in said panels on said one of the first and second rupture discs.

8. Apparatus as set forth in claim 7, wherein said panels are a part of a butterfly shaped support element secured to said one face of the central segment of said one of the first and second rupture discs, said element having a unitary sector extending between and interconnecting the panel portions thereof.

9. Apparatus as set forth in claim 8, wherein said sector of the butterfly shaped element extends across and is located in alignment with the hinge portion of the central segment of the rupture disc.

10. Apparatus as set forth in claim 7, wherein said panels are spot welded to said one face of said one of the fist and second rupture discs.

11. Apparatus as set forth in claim 7, wherein each of said lines of weakness is defined by a series of elongated end-to-end spaced slits extending through the central section of the rupture disc, said slits being separated from one another by individual webs that are unitary with the remainder of the central section of the disc.

12. Apparatus as set forth in claim 11, wherein each of said slits is of substantially greater length than the width of each web between respective ends of adjacent slits.

13. Apparatus as set forth in claim 12, wherein the end region slits are of lesser length than the length of the slits of the remainder of the lines of weakness.

* * * * *